(12) United States Patent
Wu et al.

(10) Patent No.: US 11,139,934 B2
(45) Date of Patent: Oct. 5, 2021

(54) METHOD FOR TRANSMITTING REFERENCE SIGNAL, DEVICE, AND SYSTEM

(71) Applicant: HUAWEI TECHNOLOGIES CO., LTD., Shenzhen (CN)

(72) Inventors: Ming Wu, Shenzhen (CN); Yi Qin, Kista (SE); Chi Zhang, Shanghai (CN); Zhengwei Gong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/503,474

(22) Filed: Jul. 4, 2019

(65) Prior Publication Data
US 2019/0327057 A1   Oct. 24, 2019

Related U.S. Application Data

(63) Continuation of application No. PCT/CN2017/118144, filed on Dec. 23, 2017.

(30) Foreign Application Priority Data

Jan. 4, 2017   (CN) .......................... 201710005341.1

(51) Int. Cl.
*H04L 5/00*   (2006.01)
*H04W 72/04*   (2009.01)

(52) U.S. Cl.
CPC .......... *H04L 5/0048* (2013.01); *H04L 5/0039* (2013.01); *H04W 72/0453* (2013.01)

(58) Field of Classification Search
CPC ... H04B 7/0452; H04L 5/0039; H04L 5/0048; H04L 5/005; H04L 5/0094;
(Continued)

(56) References Cited

U.S. PATENT DOCUMENTS 9,106,357 B2   8/2015   Lin et al.
2011/0217985 A1   9/2011   Gorokhov
(Continued)

FOREIGN PATENT DOCUMENTS

CN   102957471 A   3/2013
CN   104247359 A   12/2014
(Continued)

OTHER PUBLICATIONS

Qualcomm Incorporated: "Views on UL DMRS design", 3GPP TSG-RAN WG1 #87 R1-1612050, Nov. 14-18, 2016. total 4 pages, XP051176011.
(Continued)

*Primary Examiner* — Zhensheng Zhang
(74) *Attorney, Agent, or Firm* — Hauptman Ham, LLP

(57) ABSTRACT

Embodiments provide a method for transmitting a reference signal between a base station and a terminal. In this method, a parameter is determined by a terminal based on frequency domain location information of a frequency domain resource unit. The parameter is used to determine a sequence of the reference signal, and the reference signal is carried on the frequency domain resource unit. The reference signal can be sent to the base station by the terminal. In some embodiments, the reference signal sent by the base station can be received by the terminal. According to this method, a peak-to-average power ratio when a single terminal sends data to a base station can be reduced, and communication interference between different cells can be canceled or reduced as much as possible.

17 Claims, 13 Drawing Sheets

(58) Field of Classification Search
CPC ............ H04L 27/2613; H04L 27/2614; H04L 27/262; H04L 5/00; H04L 5/0007; H04W 72/04; H04W 72/0453; H04W 72/08; H04W 72/082
See application file for complete search history.

(56) References Cited

U.S. PATENT DOCUMENTS

| | | | |
|---|---|---|---|
| 2013/0265951 A1 | 10/2013 | Ng et al. | |
| 2015/0085793 A1 | 3/2015 | Luo et al. | |
| 2017/0026955 A1* | 1/2017 | Noh | H04W 72/0413 |
| 2017/0195942 A1* | 7/2017 | Zhao | H04W 24/02 |
| 2018/0026684 A1 | 1/2018 | Wei et al. | |

FOREIGN PATENT DOCUMENTS

| | | |
|---|---|---|
| CN | 105556887 A | 5/2016 |
| EP | 2418781 A2 | 2/2012 |
| WO | 2016127309 A1 | 8/2016 |

OTHER PUBLICATIONS

Ericsson, "Concatenated block RS design", 3GPP TSG-RAN WG1#87 R1-1612327, Reno, USA Nov. 14-18, 2016, total 3 pages.
3GPP TS 36.211 V14.1.0 (Dec. 2016); 3rd Generation Partnership Project;Technical Specification Group Radio Access Network; Evolved Universal Terrestrial Radio Access (E-UTRA); Physical channels and modulation(Release 14); total 175 pages.

* cited by examiner

METHOD FOR TRANSMITTING REFERENCE SIGNAL, DEVICE, AND SYSTEM

CROSS-REFERENCE TO RELATED APPLICATIONS

This application is a continuation of International Application No. PCT/CN2017/118144, filed on Dec. 23, 2017, which claims priority to Chinese Patent Application No. 201710005341.1, filed on Jan. 4, 2017. The disclosures of the aforementioned applications are hereby incorporated by reference in their entireties.

TECHNICAL FIELD

This application relates to wireless communications technologies, and in particular, to a communication method, a device, and a system that are related to reference signal transmission.

BACKGROUND

A Long Term Evolution (long term evolution, LTE) system includes an uplink reference signal and a downlink reference signal, and the uplink reference signal includes a demodulation reference signal (demodulation reference signal, DMRS) and a sounding reference signal (sounding reference signal, SRS). Both the DMRS and the SRS are generated based on a Zadoff-Chu (ZC) sequence or a quadrature phase shift keying (quadrature phase shift keying, QPSK) sequence. A specific process includes: generating a base sequence and performing a cyclic shift on the base sequence to obtain a reference signal sequence.

With development of communications technologies, using a technical solution of flexible scheduling for multi-user multiple-input multiple-output (multi-user multiple-input multiple-output, MU-MIMO) receives wide attention. However, communication resources may overlap between a plurality of users by using this technical solution. If a design scheme for a reference signal in the LTE system is still used, MU-MIMO performance is greatly deteriorated. Further, in a dynamic time division duplex (dynamic time division duplex, D-TDD) scenario, severe uplink-downlink cross interference also occurs between cells.

SUMMARY

This application describes a method for transmitting a reference signal in a communications system, an apparatus, and a system.

According to one aspect, an embodiment of this application provides a method for transmitting a reference signal in a communications system, where the communications system includes a terminal and a base station, and the method includes:

determining, by the terminal, a parameter based on frequency domain location information of a frequency domain resource unit, where the parameter is used to determine a sequence of the reference signal, and the reference signal is carried on the frequency domain resource unit; and sending, by the terminal, the reference signal to the base station, or receiving, by the terminal, the reference signal sent by the base station.

Full bandwidth or a subband of the communications system is divided into a plurality of frequency domain resource units, the frequency domain resource unit is a resource unit allocated to the terminal, and the terminal can communicate with the base station on the frequency domain resource unit.

In a possible design, one or at least two resource units are allocated to the terminal, or one or at least two frequency domain resource units are used to carry the reference signal. When at least two resource units are allocated to the terminal, a total reference signal of the terminal on the full bandwidth or the subband may be obtained by combining reference signals that are carried on the resource units.

In a possible design, the frequency domain location information of the frequency domain resource unit includes an identifier of the frequency domain resource unit; or the frequency domain location information of the frequency domain resource unit includes a frequency domain start location of the resource unit.

In a possible design, the frequency domain resource unit is mapped to one or more contiguous subcarriers, or the frequency domain resource unit is mapped to non-contiguous subcarriers; and if the frequency domain resource unit is mapped to non-contiguous subcarriers, the terminal further determines, based on the frequency domain location information of the frequency domain resource unit, a weighting coefficient for mapping the sequence of the reference signal to each subcarrier. Different weighting coefficients may be represented by different phase shifts.

In a possible design, the terminal further determines the parameter based on identification information of a cell in which the terminal is located. The identification information of the cell may be a cell identity (identity, ID).

In a possible design, the terminal belongs to a first cell that may be corresponding to a first cell ID. The communications system further includes a second cell that may be corresponding to a second cell ID. The parameter varies between the first cell and the second cell. In other words, parameters of the first cell and the second cell on a same frequency domain resource unit are different.

In a possible design, the terminal belongs to the first cell, the frequency domain resource unit includes a first frequency domain resource unit and a second frequency domain resource unit, for the first cell, a first parameter is used to determine a sequence of a reference signal carried on the first frequency domain resource unit, the second parameter is used to determine a sequence of a reference signal carried on the second frequency domain resource unit, and the first parameter is different from the second parameter. In this way, a peak-to-average power ratio when the terminal sends data can be reduced.

In a possible design, the terminal belongs to the first cell, and for the first cell, parameters of a sequence of the reference signal constitute a first parameter set. The communications system further includes a second cell, and for the second cell, parameters of a sequence of the signal constitute a second parameter set. The first parameter set is the same as or partially overlaps the second parameter set. In this way, a quantity of required parameters can be reduced.

In a possible design, full bandwidth or a subband of the communications system includes n frequency domain resource units with contiguous frequency domain locations, and n parameters are successively allocated to the n frequency domain resource units with contiguous frequency domain locations in an order of $a_{1+x}, a_{2+x}, \ldots,$ and $a_{(n+x)\%n}$, where X is determined based on identification information of a cell, and % is a remainder operation symbol; or n parameters are successively allocated to the n frequency domain resource units with contiguous frequency domain locations in an order of $a_{1+x}, a_{2+x}, \ldots,$ and $a_{(n+x)}$, where X is determined based on identification information of a cell. Parameters of cells on a same frequency domain resource unit are different, so that RSs of different cells that are carried on a same frequency domain resource unit are quasi-orthogonal, and therefore communication interference between the cells is greatly reduced.

In a possible design, the parameters may be further allocated through interleaving. In this way, a correlation between parameters on different frequency domain resource units is further reduced, so that a peak-to-average power ratio and interference between neighboring cells are reduced.

In a possible design, the terminal further determines the parameter based on time domain location information of the frequency domain resource unit. In this way, reference signal interference between cells is more randomized.

In a possible design, the terminal further determines the parameter based on a size of the frequency domain resource unit. Optionally, the size of the frequency domain resource unit may be indicated to the terminal by the base station. A size of a frequency domain resource unit in the communications system is configured, so that flexibility of the communications system is implemented, RS performance is improved, and indication overheads are reduced.

In a possible design, the size of the frequency domain resource unit is determined based on at least one of: a subband identifier, a frequency band identifier, configuration information of the base station, and a type of the RS.

In a possible design, the terminal further determines the parameter based on first configuration information of the base station. The first configuration information is configured by the base station, and is different from the frequency domain or time domain location information, and is also different from information such as identification information of a cell. According to the method, orthogonality of RSs on a same frequency domain resource unit between cells can be implemented.

In a possible design, the terminal belongs to a first cell, and the communications system further includes a third cell. If the first configuration information configured by the base station does not vary between the first cell and the third cell, for the first cell and the third cell, the parameter does not vary, and the reference signal has different orthogonal coefficients. The orthogonal coefficient may be a cyclic shift value, or may be an orthogonal cover code.

In a possible design, the sequence of the reference signal includes a Zadoff-Chu sequence, and the parameter is a root of the ZC sequence; or the sequence of the reference signal is a pseudo random PN sequence, and the parameter is an initialized value of the PN sequence.

In a possible design, the reference signal is an uplink reference signal or a downlink reference signal. Specifically, the uplink reference signal may be a DMRS or an SRS. The downlink reference signal may be a cell-specific reference signal (cell-specific RS, CRS), a terminal-specific reference signal (terminal-specific RS), or a multicast/broadcast over single frequency network (multicast/broadcast over single frequency network, MBSFN) RS.

According to another aspect, an embodiment of this application provides a method for transmitting a reference signal in a communications system, where the communications system includes a terminal and a base station, and the method includes: determining, by the base station, a resource that is to be allocated to the terminal, where the resource includes a frequency domain resource unit; and receiving, by the base station, the reference signal sent by the terminal, or sending, by the base station, the reference signal to the terminal, where the reference signal is carried on the frequency domain resource unit, a sequence of the reference signal is determined by a parameter, and the parameter is determined based on frequency domain location information of the frequency domain resource unit.

In a possible design, a plurality of frequency domain resource units are used to carry the reference signal on full bandwidth or a subband.

In a possible design, the parameter is further determined based on at least one of: identification information of a cell in which the terminal is located, time domain location information of the frequency domain resource unit, a size of the frequency domain resource unit, and first configuration information indicated to the terminal by the base station.

In a possible design, the size of the frequency domain resource unit is indicated to the terminal by the base station.

In a possible design, the frequency domain location information of the frequency domain resource unit includes an identifier of the frequency domain resource unit; or the frequency domain location information of the frequency domain resource unit includes a frequency domain start location of the resource unit.

In a possible design, the frequency domain resource unit is mapped to one or more contiguous subcarriers, or the frequency domain resource unit is mapped to non-contiguous subcarriers; and if the frequency domain resource unit is mapped to non-contiguous subcarriers, a weighting coefficient for mapping the sequence of the reference signal to each subcarrier may be determined by the frequency domain location information of the frequency domain resource unit.

In a possible design, the terminal belongs to a first cell, the communications system further includes a second cell, and the parameter varies between the first cell and the second cell.

In a possible design, the terminal belongs to the first cell, the frequency domain resource unit includes a first frequency domain resource unit and a second frequency domain resource unit, for the first cell, a first parameter is used to determine a sequence of a reference signal carried on the first frequency domain resource unit, the second parameter is used to determine a sequence of a reference signal carried on the second frequency domain resource unit, and the first parameter is different from the second parameter.

In a possible design, the communications system further includes a third cell. If the first configuration information configured by the base station does not vary between the first cell and the third cell, for the first cell and the third cell, the parameter does not vary, and the reference signal has different orthogonal coefficients.

In a possible design, the size of the frequency domain resource unit is determined based on at least one of: a subband identifier, a frequency band identifier, configuration information of the base station, and a type of the RS.

In a possible design, the sequence of the reference signal is a Zadoff-Chu sequence, and the parameter includes a root of the ZC sequence; or the sequence of the reference signal is a pseudo random PN sequence, and the parameter is an initialized value of the PN sequence.

According to another aspect, an embodiment of the present invention provides a communications device, and the device may be a terminal, and has a function of implementing behavior of the terminal in the foregoing method design. The function may be implemented by hardware, and a structure of the terminal includes a transceiver and a processor. Alternatively, the function may be implemented by executing corresponding software by hardware. The hardware or the software includes one or more modules corresponding to the function. The module may be software and/or hardware.

According to another aspect, an embodiment of the present invention provides another communications device, and the device may be a base station, and has a function of implementing behavior of the base station in the foregoing method design. The function may be implemented by hardware, or may be implemented by executing corresponding software by hardware. The hardware or the software includes one or more modules corresponding to the function.

According to still another aspect, an embodiment of the present invention provides a communications system, and the system includes the base station and the terminal that are described in the foregoing aspects.

According to yet another aspect, an embodiment of the present invention provides a computer storage medium, configured to store a computer software instruction used by the foregoing terminal, and the computer software instruction includes a program designed for executing the foregoing aspects.

According to yet another aspect, an embodiment of the present invention provides a computer storage medium, configured to store a computer software instruction used by the foregoing base station, and the computer software instruction includes a program designed for executing the foregoing aspects.

According to yet another aspect, an embodiment of the present invention provides a computer storage medium, configured to store a computer software instruction used by the foregoing terminal, and the computer software instruction includes a program designed for executing the foregoing aspects.

According to the embodiments of this application, a peak-to-average power ratio when a single terminal sends data to a base station can be reduced, and communication interference between different cells can be canceled or reduced as much as possible. Further, the technical solutions can further ensure that parameters used to generate a reference signal sequence can be sufficiently allocated to each frequency domain resource unit, and ensure relatively small communications system resource overheads.

BRIEF DESCRIPTION OF DRAWINGS

FIG. 11(*b*) is another schematic diagram of parameter allocation according to an embodiment of this application;

FIG. 11(*c*) is another schematic diagram of parameter allocation according to an embodiment of this application;

DESCRIPTION OF EMBODIMENTS

This application is a technical solution related to a reference signal (reference signal, RS). For example, in the 3rd Generation Partnership Project (the 3rd generation partnership project, 3GPP) Technical Specification (technical specification, TS) 36.211 Version 13.2.0 (v13.2.0), an uplink reference signal is described in Section 5.5, and a downlink reference signal is described in Section 6.10. Specifically, Section 5.5.1 mainly describes generation of an uplink reference signal sequence, Section 5.5.2 and Section 5.5.3 further respectively describe DMRS and SRS sequences and mapping manners of the sequences, and Section 6.10.3A specifically describes generation, a mapping manner, and the like of a downlink DMRS sequence. The foregoing content is for reference, and differences between manners of generating a downlink reference signal sequence and an uplink reference signal sequence in an LTE-A system are briefly described.

Figure 1:
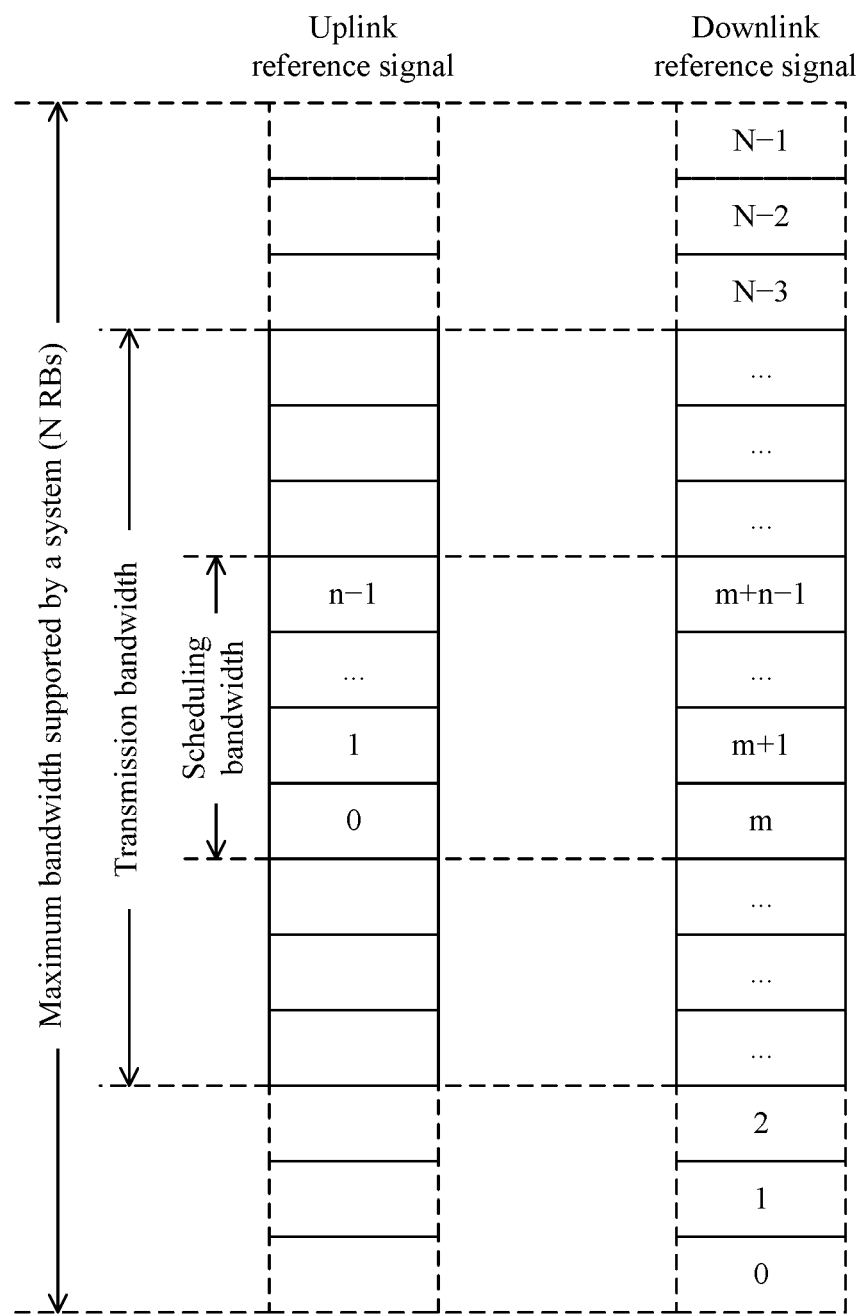
FIG. 1 is a diagram of a relationship between a reference signal and bandwidth in an LTE system according to an embodiment of this application.

1. An uplink reference signal is generated based on scheduling bandwidth, there is no correspondence between a sequence of the reference signal and a specific resource number, and the sequence relates only to a relative resource number in the scheduling bandwidth. In a process of generating a downlink reference signal, reference signal sequences are first generated based on maximum bandwidth supported by LTE-A, and then a corresponding reference signal sequence is selected from the reference signal sequences based on scheduling bandwidth of the downlink reference signal. As shown in FIG. 1, a number in the figure is an index value of a reference signal sequence, uplink reference signals are numbered from 0 based on scheduling bandwidth, downlink reference signals are numbered from 0 based on a maximum system bandwidth, and a required reference signal is selected from the downlink reference signals based on the scheduling bandwidth. In LTE-A, maximum system transmission bandwidth is 20 MHz/100 RBs.

2. An LTE-A downlink reference signal is generated based on a pseudo random (pseudo random, PN) sequence. For a specific pseudo random sequence generation method, refer to Section 7.2 in 3GPP TS 36.211 v13.2.0.

In an LTE system, a base station may implement multi-UE multiplexing, namely, MU-MIMO transmission, by scheduling a plurality of user equipments (user equipment, UE) on a same resource. During multi-UE multiplexing in downlink, for example, sequences of different reference signals are configured for different UEs, and these reference signals are transmitted on a same time-frequency-code resource. However, because a multiple-antenna system may transmit a reference signal in different directions, strength of a reference signal of another UE that is received by the UE is much lower than strength of a reference signal of the UE, so that multiplexing is implemented.

For downlink, because a reference signal is a PN sequence, reference signal sequences corresponding to different initialized values of the reference signal sequences are not totally orthogonal to each other, and therefore it cannot be ensured that reference signals between UEs in MU-MIMO are necessarily orthogonal.

For uplink, for example, SRSs may be transmitted on a same time-frequency resource, and different UEs use different cyclic shifts. In this case, if transmission bandwidth of SRSs of two UEs is the same, SRS sequences of two users on a same time-frequency resource are the same, but cyclic shift phase offsets are different. In this case, the SRSs of the two UEs are orthogonal, and a base station end may separate the SRS signals of the two UEs based on different cyclic shifts of the two UEs. For uplink MU-MIMO transmission, different cyclic shifts are also used. When scheduling bandwidth of two UEs is the same, DMRSs are orthogonal, and the base station may estimate channels of the two UEs based on cyclic shifts of the two UEs.

Figure 2:
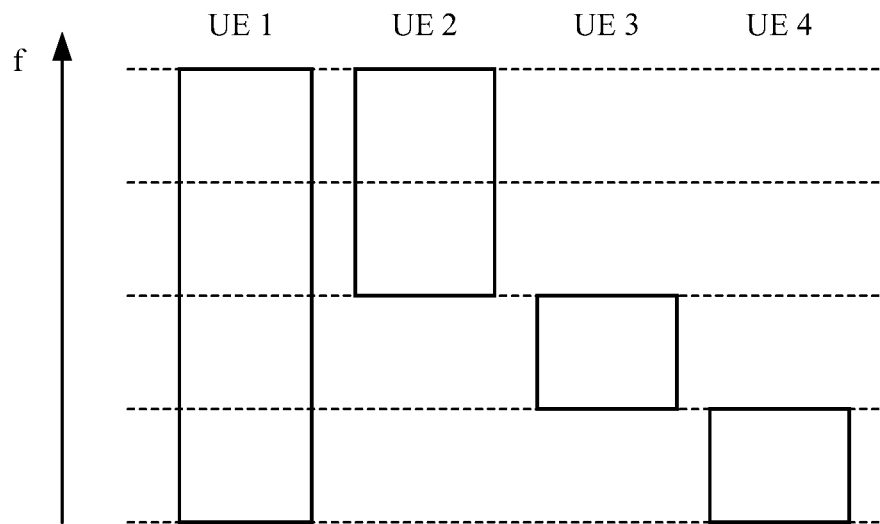
FIG. 2 is a schematic diagram of a MU-MIMO multi-user equipment communication resource according to an embodiment of this application.

The 3GPP is currently conducting research on a next-generation communications system standard, and flexible scheduling for uplink MU-MIMO is widely supported. However, in this case, communication resources may overlap between a plurality of UEs in the MU-MIMO, as shown in FIG. 2. In FIG. 2, for ease of reading, communication resources used by UE 1, UE 2, UE 3, and UE 4 are shown through expansion in the figure. Actually, time domain locations of the communication resources are the same. It can be learned from FIG. 2 that the communication resources used by the UE 2, the UE 3, and the UE 4 separately overlap with the communication resource used by the UE 1 in time domain. In this case, if an existing reference signal design of an LTE system is used, lengths of communication resources allocated to different users are different, and ZC sequences of different lengths are not orthogonal through a cyclic shift. In this case, MU-MIMO performance is reduced. Therefore, some companies have proposed a new reference signal design, referred to as a block (block) reference signal (reference signal, RS) or a resource unit specific reference signal (resource unit specific RS).

A main design idea of the block RS (or the resource unit specific RS) is to divide bandwidth into a plurality of blocks (or resource units), and design one RS for each block. An RS of UE on bandwidth is obtained by connecting and combining one or more block RSs. When communication resources partially overlap between a plurality of users in MU-MIMO, a length of a communication resource overlapping part is an integer multiple of a minimum length of a scheduled communication resource. A length of the block RS is set to the minimum length of the scheduled communication resource, and a block RS sequence is designed, to ensure RS orthogonality on a multi-user communication resource overlapping part in the MU-MIMO.

Currently, for the block RS, it is mostly discussed that an RS is generated based on a ZC sequence.

For different UEs on a same block, different cyclic shifts (cyclic shift) of ZC sequences are used to ensure orthogonality of RSs of the different UEs on the same block.

Figure 3:
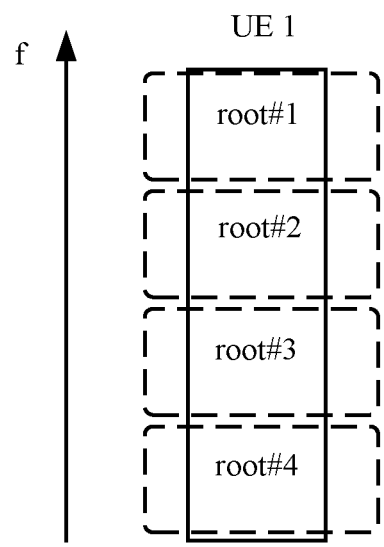
FIG. 3 is a schematic diagram of ZC root allocation according to an embodiment of this application.

For same UE, as described above, an RS on bandwidth is obtained by connecting and combining one or more block RSs. For example, in uplink MU-MIMO, a peak-to-average power ratio (peak-to-average power ratio, PAPR) when the UE sends data cannot be extremely high as required by the system. If the UE generates a ZC sequence by using a same ZC sequence root (ZC root) on all blocks, a PAPR of an entire RS is very high. There are mainly two solutions:

(1) Different blocks use ZC sequences generated by using different ZC roots. For example, as shown in FIG. 3, a frequency band is divided into four blocks. For the UE 1, RSs are generated for the four blocks respectively by using ZC sequences generated by using root #1, root #2, root #3, and root #4.

Figure 4:
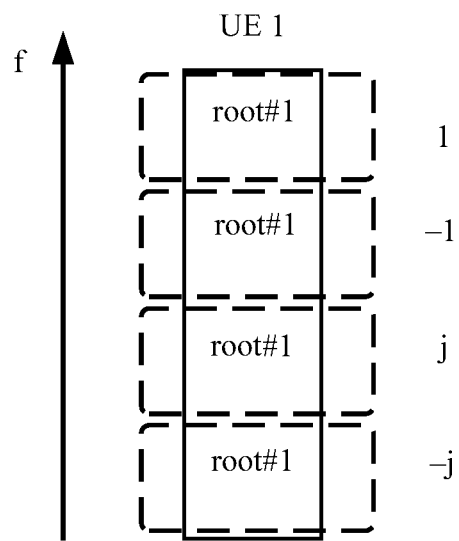
FIG. 4 is another schematic diagram of ZC root allocation according to an embodiment of this application.

(2) Different blocks use ZC sequences generated by using a same ZC root, but the ZC sequences are multiplied by different phase shifts. An optimal phase shift needs to be designed for a length of a block RS, a quantity of blocks, and a structure between block RSs. For example, in FIG. 4, a frequency band is divided into four blocks. For the UE 1, an RS is generated for each of the four blocks by using a ZC sequence generated by using root #1. However, the ZC sequences generated for all the blocks further need to be multiplied by different phase shifts, for example, multiplied by 1, j, −1, and −j respectively, to represent phase shifts of 0°, 90°, 180°, and 270°.

Figure 5:
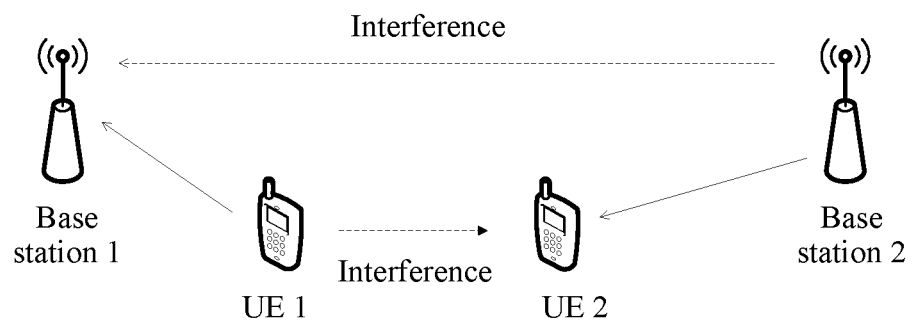
FIG. 5 shows a D-TDD scenario according to an embodiment of this application.

However, as shown in FIG. 5, in a D-TDD scenario, at a moment, the UE 1 sends uplink data to a base station 1, and a base station 2 sends downlink data to the UE 2. In this case, sending the uplink data to the base station 1 by the UE 1 causes interference to receiving, by the UE 2, the downlink data sent by the base station 2, and sending the downlink data to the UE 2 by the base station 2 causes interference to receiving the uplink data from the UE 1 by the base station 1. Therefore, severe uplink-downlink cross interference that may occur between cells further needs to be considered.

When inter-cell impact is considered, if the foregoing solution (1) is used, in other words, if a frequency band is divided into n blocks, and it is assumed that there are m cells in a communications system, n×m ZC roots are required. When n and m are very large, it is obvious that the ZC roots are not enough to allocate. If the solution (2) is used, different block RSs in a same cell use ZC sequences generated by using a same ZC root, and the ZC sequences are multiplied by different phase shifts. This is extended to another cell. For example, a neighboring cell uses a different ZC root, different blocks in the neighboring cell use ZC sequences generated by using a same ZC root, and the ZC sequences are multiplied by different phase shifts. However, a design of the phase shift is complex, and this method is not conducive to randomizing interference between cells. If two cells use two ZC roots with a relatively large correlation, interference to each of the two cells on entire bandwidth is relatively large. In addition, according to the method, during inter-cell interference cancellation, another cell needs to be further notified of information such as a phase shift of a current cell, and therefore signaling overheads are very large.

In this disclosure, a reference signal is designed based on a block RS, and a parameter used to generate a reference signal on a block is determined based on at least frequency domain location information of the block, so that a PAPR when single UE sends data to a base station can be reduced, and communication interference between different cells can be canceled or reduced as much as possible. Further, the technical solutions can further ensure that parameters (for example, ZC roots) used to generate a reference signal sequence can be sufficiently allocated to each block, and ensure relatively small communications system resource overheads.

Figure 6:
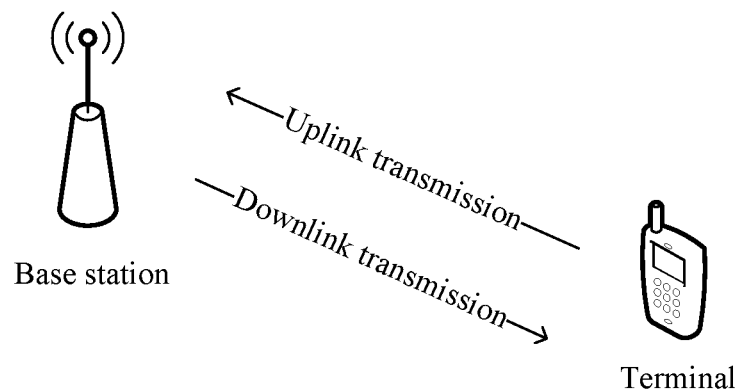
FIG. 6 shows an architecture of a communications system according to an embodiment of this application.
Figure 7:
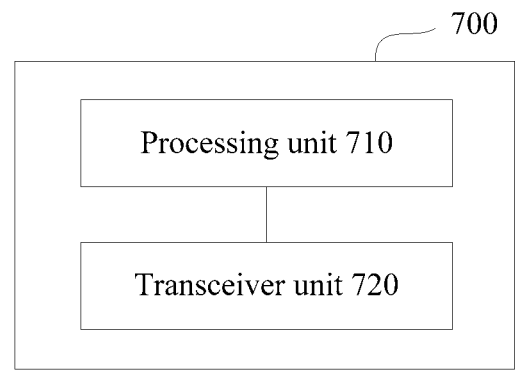
FIG. 7 is a schematic diagram of a terminal according to an embodiment of this application.
Figure 8:
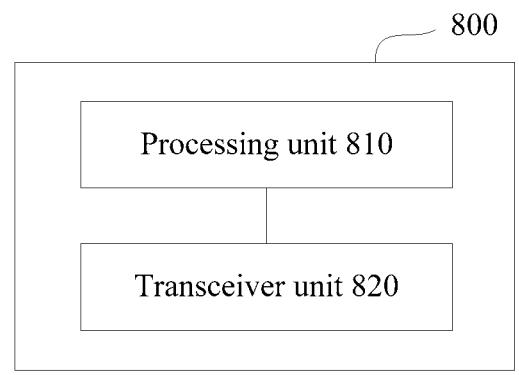
FIG. 8 is a schematic diagram of another base station according to an embodiment of this application.

The following describes a system operating environment in accordance with this disclosure. The technology described in this disclosure is applicable to an LTE system, or another wireless communications system that use various radio access technologies, for example, a system that uses an access technology such as Code Division Multiple Access (Code Division Multiple Access, CDMA), Frequency Division Multiple Access (Frequency Division Multiple Access, FDMA), Time Division Multiple Access (Time Division Multiple Access, TDMA), orthogonal frequency division multiple access (frequency division multiple access, OFDMA), and single carrier frequency division multiple access (single carrier frequency division multiple access, SC-FDMA). The technology is further applicable to a subsequent evolved system, for example, a fifth generation 5G system (which may also be referred to as a new radio (new radio, NR) system). FIG. 6 shows an infrastructure of a communications system. A base station and a terminal may transmit data or signaling through a wireless interface, including uplink transmission and downlink transmission. The terminal in this application may be a device (device) providing voice and/or data connectivity for a user, and includes a wired terminal and a wireless terminal. The wireless terminal may be a handheld device with a wireless connection function, or another processing device connected to a wireless modem, or a mobile terminal that communicates with one or more core networks by using a radio access network. For example, the wireless terminal may be a mobile phone, a computer, a tablet computer, a personal digital assistant (personal digital assistant, PDA), a mobile Internet device (mobile Internet device, MID), a wearable device, an e-book reader (e-book reader), or the like. For another example, the wireless terminal may be a portable, pocket-sized, handheld, computer built-in, or in-vehicle mobile device. For still another example, the wireless terminal may be a mobile station (mobile station) or an access point (access point). The UE mentioned above is a type of terminal, and is a name in the LTE system. For ease of description, in subsequent descriptions of this application, the devices mentioned above are collectively referred to as a terminal. The base station in this application is an apparatus that is deployed in a radio access network (radio access network, RAN) and that is configured to provide a wireless communication function for the terminal. The base station may include a macro base station, a micro base station, a relay node, an access point base station controller, a transmission/reception point (transmission/reception point, TRP), and the like in various forms. In systems using different radio access technologies, the base station may have different specific names. For example, the base station is referred to as an evolved NodeB (evolved NodeB, eNB) in an LTE network, or the base station may be referred to as a new radio NodeB (new radio NodeB, gNB) in a subsequent evolved system. Further, the terminal described above may be a terminal 700 shown in FIG. 7, and is configured to perform method steps related to the terminal in various embodiments of this application. As shown in FIG. 7, the terminal 700 includes a processing unit 710 and a transceiver unit 720. Further, the base station described above may be a base station 800 shown in FIG. 8, and is configured to perform method steps related to the base station in various embodiments of this application. As shown in FIG. 8, the base station 800 includes a processing unit 810 and a transceiver unit 820. It should be noted that an operation performed by the processing unit 710 or the transceiver unit 720 may be considered as an operation performed by the terminal 700, and an operation performed by the processing unit 810 or the transceiver unit 820 may be considered as an operation performed by the base station 800. The processing unit 810 in the base station 800 may be implemented by a processor in the base station 800, and the transceiver unit 820 may be implemented by a transceiver in the base station 800. The processing unit 710 in the terminal 700 may be implemented by a processor in the terminal 700, and the transceiver unit 720 may be implemented by a transceiver in the terminal 700.

The following describes some terms used in this disclosure.

A relationship between a user and a terminal (or UE) in this disclosure may be that the user uses the terminal (or the UE) to access a network, to communicate with a base station.

A frequency domain resource unit described in this disclosure may be understood as the block (or resource unit) mentioned above, and is obtained by dividing bandwidth in frequency domain. In this case, an RS of the UE on bandwidth is an RS on one frequency domain resource unit, or is obtained by connecting and combining RSs on a plurality of frequency domain resource units.

Figure 9:
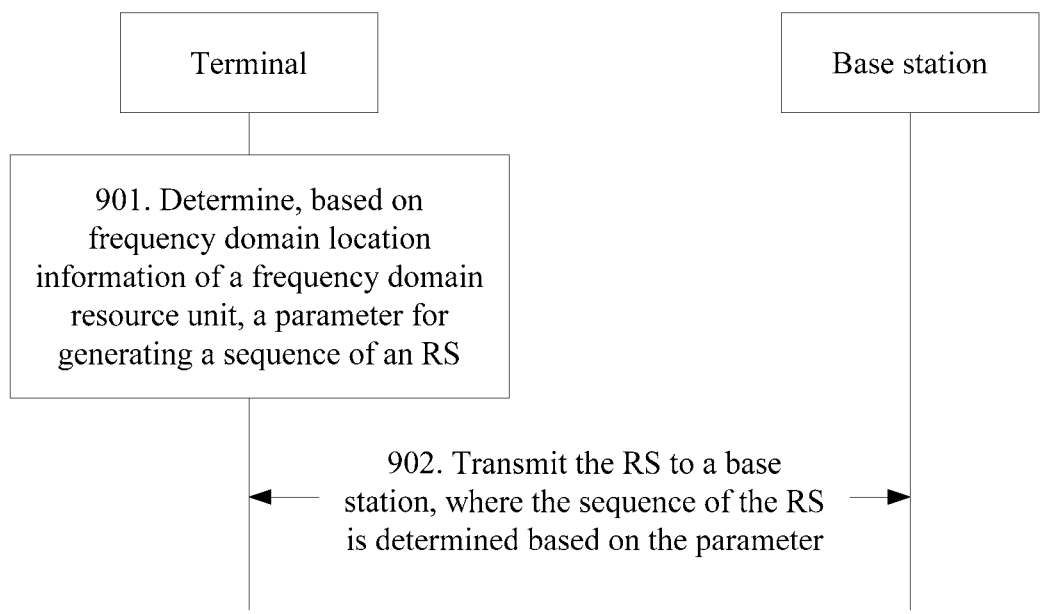
FIG. 9 is a schematic interaction diagram of reference signal transmission according to an embodiment of this application.

As shown in FIG. 9, in various technical solutions in accordance with the disclosure, in part 901, UE determines, based on frequency domain location information of a frequency domain resource unit, a parameter for generating a sequence of an RS, where the reference signal is carried on the frequency domain resource unit. In part 902, the UE transmits the reference signal to the base station, where the sequence of the reference signal is determined based on the parameter. That the UE transmits the reference signal to the base station may include: sending, by the UE, the reference signal to the base station. In this case, the corresponding reference signal may be an uplink reference signal, for example, a DMRS or an SRS of a data part or a control part. Then the base station may combine, based on a quantity of actually scheduled frequency domain resource units, RSs generated on the plurality of frequency domain resource units, for measurement, demodulation, or the like on a data channel or a control channel. Because the UE sends the RS according to a scheduling instruction of the base station, when receiving the RS, the base station may know that the RS is sent by the UE.

Alternatively, the UE receives the reference signal sent by the base station. In this case, the corresponding reference signal may be a downlink reference signal, for example, a cell-specific reference signal (cell-specific RS, CRS), a terminal-specific reference signal (UE-specific RS), or a multicast/broadcast over single frequency network (multicast/broadcast over single frequency network, MBSFN) RS. The UE may identify, based on the parameter determined in part 901, the reference signal sent by the base station in part 902. The reference signal is used for measurement, demodulation, or the like on a data channel or a control channel. The base station may send the RS to the UE in a broadcast message or a dedicated message, and because scrambling is performed by using an identifier of the UE, the UE can identify that the RS is sent by the base station to the UE.

In some embodiments, the parameter may be further determined based on at least one of: identification information of a cell, time domain location information of the frequency domain resource unit, a size of the frequency domain resource unit, configuration information of the base station, and the like.

Further, the base station may indicate the size of the frequency domain resource unit and the configuration information to the UE by using a message.

Embodiment 1

Based on the technical solution in FIG. 9, an embodiment is described in detail as follows:

A communications system may divide full bandwidth into several subbands. This application is applicable to full bandwidth or any subband of the communications system. For example, when the full bandwidth of the communications system is relatively large, the following example technical solutions may be first used on a subband, and then extended to another subband in a same manner.

Figure 10:
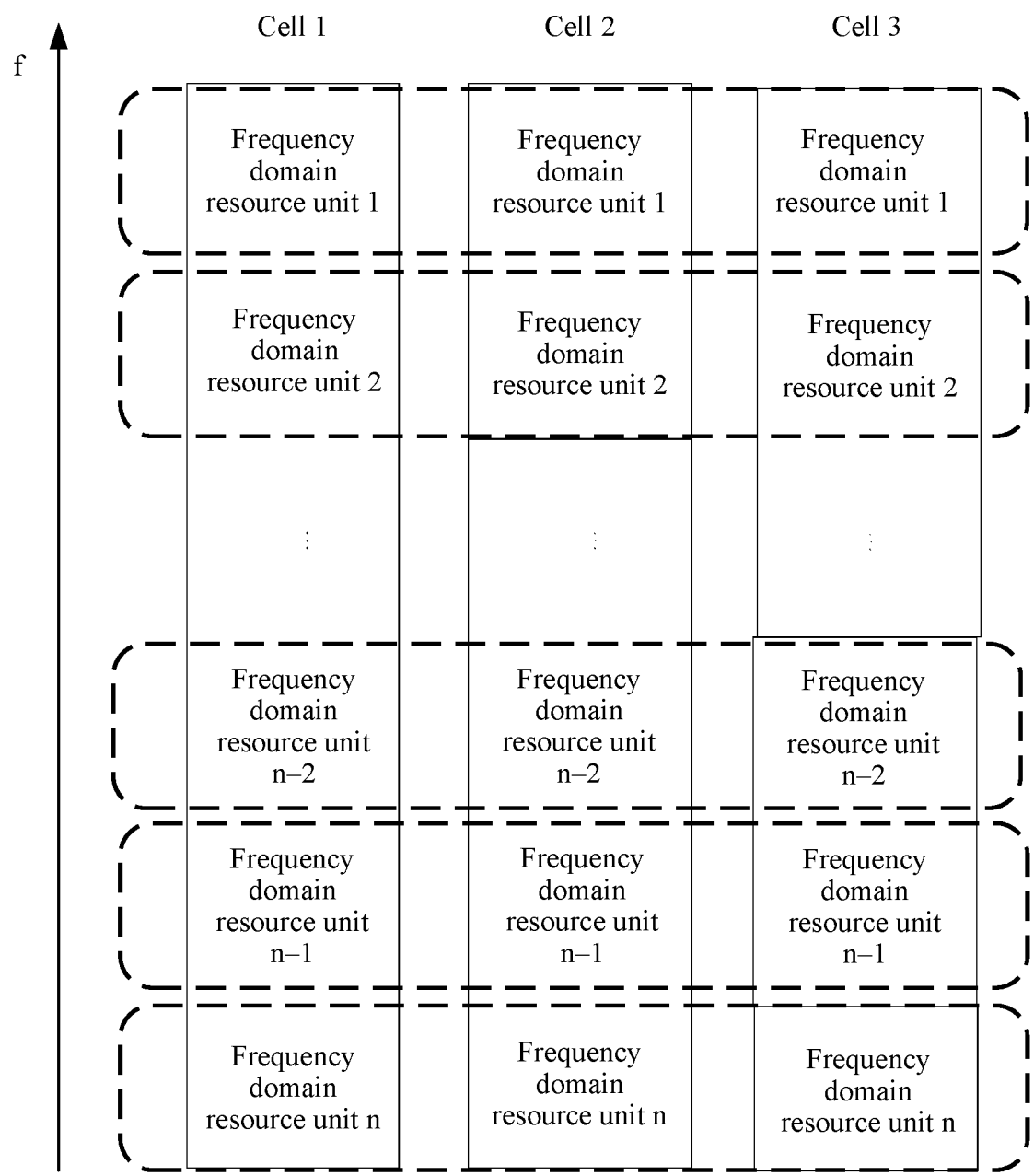
FIG. 10 is a schematic diagram of frequency domain resource unit division according to an embodiment of this application.

As shown in FIG. 10, in frequency domain, the full bandwidth or the subband of the communications system is divided into a plurality of frequency domain resource units: a frequency domain resource unit 1, a frequency domain resource unit 2, . . . , and a frequency domain resource unit n. The frequency domain resource units may be contiguous in frequency domain. In the communications system, there are a plurality of cells that use the full bandwidth or the subband. In FIG. 10, a cell 1, a cell 2, and a cell 3 are used as an example. For ease of reading, communication resources that can be used by the cell 1, the cell 2, and the cell 3 are shown through expansion in the figure. Actually, time domain locations of the communication resources are the same. It is assumed that the cell 1 is adjacent to the cell 2, and the cell 2 is adjacent to the cell 3.

When a terminal needs to use at least one of the plurality of frequency domain resource units to transmit signaling or data to a base station, the terminal needs to transmit an RS to the base station for channel estimation or measurement. If more than one frequency domain resource unit is used, the RS transmitted by the terminal to the base station is obtained by combining RSs on the frequency domain resource units.

Currently, parameters of sequences of RSs that are carried on the frequency domain resource unit 1, the frequency domain resource unit 2, . . . , and the frequency domain resource unit n are designed. It is assumed that, for the cell 1, a set of parameters for generating sequences of RSs on the frequency domain resource unit 1, the frequency domain resource unit 2, . . . , and the frequency domain resource unit n is a first set. For the cell 2, a second set including parameters that are used for generating sequences of RSs on the frequency domain resource unit 1, the frequency domain resource unit 2, . . . , and the frequency domain resource unit n may be the same as or partially overlap the first set. Similarly, for the cell 3, a third set including parameters that are used for generating sequences of RSs on the frequency domain resource unit 1, the frequency domain resource unit 2, . . . , and the frequency domain resource unit n may be the same as or partially overlap the first set. In an implementation, two parameters with a relatively low correlation in the set may be selected and allocated to two frequency domain resource units that are adjacent in frequency domain. When parameters used to generate RS sequences are different (there may be a relatively low correlation between the parameters), it may be considered that the parameters are quasi-orthogonal. Therefore, for a same cell, different frequency domain resource units use different parameters to ensure that the terminal has a relatively low PAPR when sending data on these frequency domain resource units. In addition, for different cells, because the first set, the second set, and the third set are the same or partially overlap, a quantity of required parameters is reduced as much as possible.

In an implementation, a cyclic shift may be performed for an arrangement order of parameters in the sets, and the parameters are separately allocated to the frequency domain resource unit 1, the frequency domain resource unit 2, . . . , and the frequency domain resource unit n that are used by the cell 1, the cell 2, and the cell 3. In other words, parameters on the frequency domain resource unit 1, the frequency domain resource unit 2, . . . , and the frequency domain resource unit n that are used by the cell 1, the cell 2, and the cell 3 are successively $a_{1+x}, a_{2+x}, \ldots,$ and $a_{(n+x)\%n}$. % is a remainder operation symbol. Values of X in the subscript are different for all the cells, for example, may be determined based on identification information of the cells.

Figure 11A:
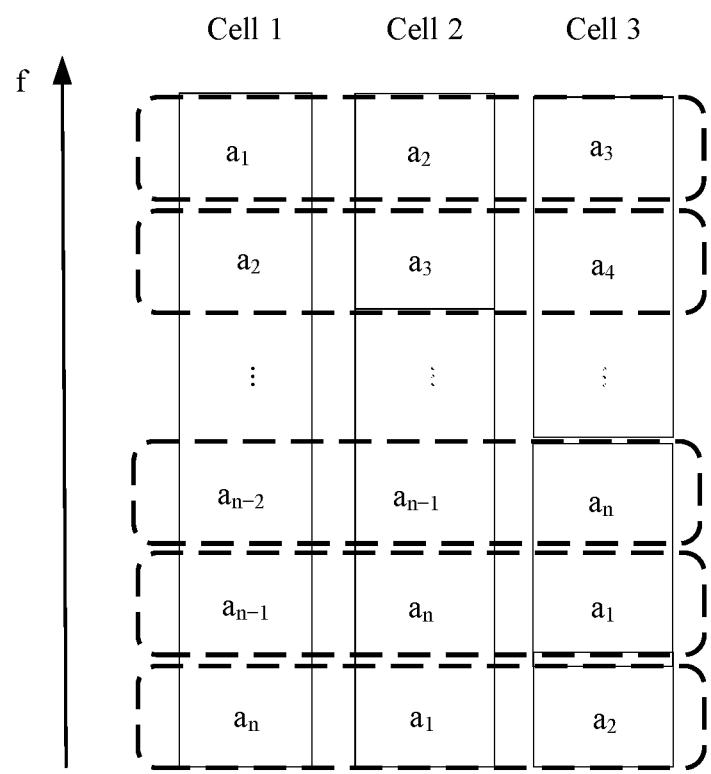
FIG. 11(*a*) is a schematic diagram of parameter allocation according to an embodiment of this application.

For example, as shown in FIG. 11(a), a cyclic shift may be performed for an arrangement order of parameters in the sets, and the parameters are separately allocated to the frequency domain resource unit 1, the frequency domain resource unit 2, . . . , and the frequency domain resource unit n that are used by the cell 1, the cell 2, and the cell 3. In other words, for the cell 1, parameters on the frequency domain resource unit 1, the frequency domain resource unit 2, . . . , and the frequency domain resource unit n are successively $a_1, a_2, \ldots,$ and $a_n$. In this case, a value of X is 0. For the cell 2, parameters on the frequency domain resource unit 1, the frequency domain resource unit 2, . . . , and the frequency domain resource unit n are successively $a_2, \ldots, a_n,$ and $a_1$. In this case, a value of X is 1. For the cell 3, parameters on the frequency domain resource unit 1, the frequency domain resource unit 2, . . . , and the frequency domain resource unit n are successively $a_3, a_4, \ldots, a_n, a_1,$ and $a_2$. In this case, a value of X is 2. In this case, the first set, the second set, and the third set may be the same.

In this way, parameters between cells on a same frequency domain resource unit are different, so that RSs of different cells that are carried on a same frequency domain resource unit are quasi-orthogonal, and therefore communication interference between the cells is greatly reduced.

In another implementation, a shift may be performed for an arrangement order of overlapping parts in parameters in the sets, and the parameters are separately allocated to the frequency domain resource unit 1, the frequency domain resource unit 2, . . . , and the frequency domain resource unit n that are used by the cell 1, the cell 2, and the cell 3. In other words, parameters on the frequency domain resource unit 1, the frequency domain resource unit 2, . . . , and the frequency domain resource unit n that are used by the cell 1, the cell 2, and the cell 3 are successively $a_{1+x}, a_{2+x}, \ldots,$ and $a_{n+x}$. Values of X in the subscript are different for all the cells, for example, may be determined based on identification information of the cells.

Figure 11B:
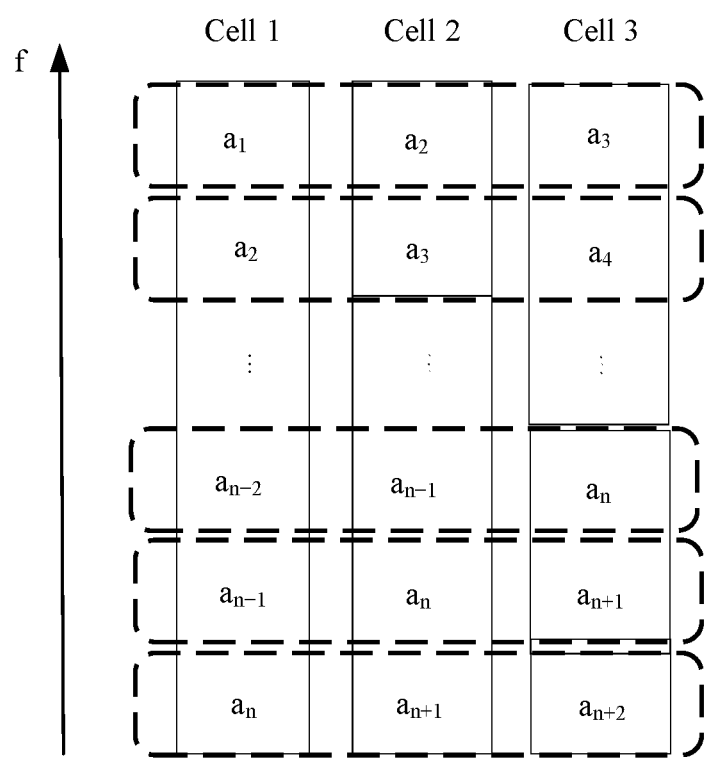

For example, as shown in FIG. 11(b), a shift may be performed for an arrangement order of overlapping parts in parameters in the sets, and the parameters are separately allocated to the frequency domain resource unit 1, the frequency domain resource unit 2, . . . , and the frequency domain resource unit n that are used by the cell 1, the cell 2, and the cell 3. For example, for the cell 1, parameters on the frequency domain resource unit 1, the frequency domain resource unit 2, . . . , and the frequency domain resource unit n are successively $a_1, a_2, \ldots,$ and $a_n$. In this case, a value of X is 0. For the cell 2, parameters on the frequency domain resource unit 1, the frequency domain resource unit 2, . . . , and the frequency domain resource unit n are successively $a_2, \ldots, a_n$, and $a_{n+1}$. In this case, a value of X is 1. For the cell 3, parameters on the frequency domain resource unit 1, the frequency domain resource unit 2, . . . , and the frequency domain resource unit n are successively $a_3, a_4, \ldots, a_n, a_{n+1}$, and $a_{n+2}$. In this case, a value of X is 2. In this case, parameters in the first set, the second set, and the third set may partially overlap.

In this case, it is only required that a total quantity of cells is less than a total quantity of parameters. Likewise, according to the method, parameters between cells on a same frequency domain resource unit are different, so that RSs of different cells that are carried on a same frequency domain resource unit are quasi-orthogonal, and therefore communication interference between the cells is greatly reduced.

To further reduce a correlation between parameters on different frequency domain resource units, interleaving may be performed for an arrangement order of parameters in the sets, and the parameters are separately allocated to the frequency domain resource unit 1, the frequency domain resource unit 2, . . . , and the frequency domain resource unit n that are used by the cell 1, the cell 2, and the cell 3. It is known that for the cell 1, parameters of sequences of RSs on the frequency domain resource unit 1, the frequency domain resource unit 2, . . . , and the frequency domain resource unit n are $a_1, a_2, \ldots,$ and $a_n$. For the cell 2, first, it is determined that parameters included in the second set are $a_{1+x}, a_{2+x}, \ldots,$ and $a_{n+x}$, (values of X may be different for all the cells, for example, may be related to identification information of the cells), and after interleaving is performed on these parameters, these parameters are allocated to different frequency domain resource units. For example, if a quantity of columns of an interleaver is 4, parameters in the second set may be divided into the following four columns:

$$a_{1+x}, a_{2+x}, a_{3+x}, a_{4+x}$$
$$a_{5+x}, a_{6+x}, a_{7+x}, a_{8+x}$$
$$a_{9+x}, a_{10+x}, a_{11+x}, a_{12+x}$$
$$\ldots$$
$$a_{n+x-3}, a_{n+x-2}, a_{n+x-1}, a_{n+x}$$

Based on the columns, the last parameter $a_{n+x-3}$ in the first column is followed by the first parameter $a_{2+x}$ in the second column, and this method is also applied to the third column and the fourth column. In this case, for the cell 2, parameters of sequences of RSs on the frequency domain resource unit 1, the frequency domain resource unit 2, . . . , and the frequency domain resource unit n may be successively $a_{1+x}, a_{5+x}, a_{9+x}, \ldots, a_{n+x-3}, a_{2+x}, a_{6+x}, a_{10+x}, \ldots, a_{n+x-2}, a_{3+x}, a_{7+x}, a_{11+x}, \ldots, a_{n+x-1}, a_{4+x}, a_{8+x}, a_{12+x}, \ldots,$ and $a_{n+x}$. A manner of determining parameters of sequences of RSs on the frequency domain resource unit 1, the frequency domain resource unit 2, . . . , and the frequency domain resource unit n of another cell is similar to this, and details are not described again.

A quantity of interleaving rows and a quantity of interleaving columns may be specially designed, to implement interleaving on parameters of reference signal sequences. If a quantity of parameters, on which interleaving is performed, of reference signal sequences does not reach a total quantity obtained by multiplying a quantity of interleaving rows by a quantity of interleaving columns, some interleaving rows and columns may be set to empty, in other words, parameters of reference signal sequences are not placed at these locations.

In the foregoing interleaving solution, if for the cell 2, parameters in the second set that is first determined are $a_{1+x}, a_{2+x}, \ldots,$ and $a_{(n+x)\%n}$ (values of X may be different for all the cells, for example, may be related to identification information of the cells). Subsequently, parameters on the frequency domain resource unit 1, the frequency domain resource unit 2, . . . , and the frequency domain resource unit n may be determined for the cell 2 in the foregoing similar interleaving manner. Parameters on the frequency domain resource unit 1, the frequency domain resource unit 2, . . . , and the frequency domain resource unit n of another cell are further determined.

Based on the foregoing solution, because a parameter allocated to generate an RS sequence is related to whether a frequency domain resource unit is the frequency domain resource unit 1, the frequency domain resource unit 2, . . . , or the frequency domain resource unit n, or is related to whether a cell is the cell 1, the cell 2, or the cell 3, it may be considered that the terminal determines the parameter based on frequency domain location information of the frequency domain resource unit and/or identification information of the cell.

The frequency domain location information of the frequency domain resource unit has a plurality of forms, for example, an identifier of the frequency domain resource unit (which may include a frequency domain identifier of the frequency domain resource), or a frequency domain start location of the frequency domain resource unit. The identification information of the cell may be a cell identity (identity, ID).

In addition, the current cell may determine information about a reference signal of a neighboring cell on the frequency domain resource unit based on the frequency domain location information of the frequency domain resource unit and a cell identity or other information of the neighboring cell. In this way, no additional signaling is required to indicate related information of the reference signal of the neighboring cell, so that signaling overheads are reduced, and reference signal interference between cells is canceled.

A manner in which the terminal determines the parameter on the frequency domain resource unit based on the frequency domain location information of the frequency domain resource unit and/or the identification information of the cell is not limited to the manner mentioned in this application.

Figure 11C:
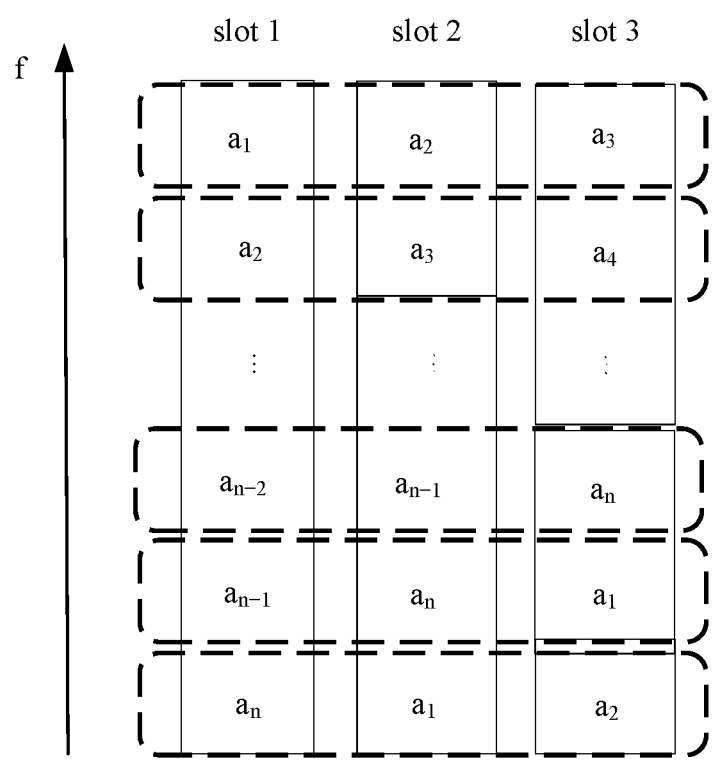

Further, to make RS interference between cells more randomized, a time domain hopping (hopping) manner may be further used. To be specific, for a same cell, parameters on different frequency domain resource units may change with time, in other words, the terminal may determine, based on time domain location information of the frequency domain resource unit, a parameter used to generate an RS sequence. A length unit of a resource of a time dimension in the communications system may be a slot (slot), a mini-slot (mini-slot), a subframe, or a symbol, or may be a transmission time interval (transmission time interval, TTI), a time unit, or the like. The time domain location information of the frequency domain resource unit may be represented by using a time domain identifier, for example, a slot number or a subframe number. For example, as shown in FIG. 11(c), for the cell 1, in a slot 1, parameters on the frequency domain resource unit 1, the frequency domain resource unit 2, . . . , and the frequency domain resource unit n are successively $a_1, a_2, \ldots,$ and an; in a slot 2, parameters on the frequency domain resource unit 1, the frequency domain resource unit 2, . . . , and the frequency domain resource unit n are successively $a_2$, . . . , $a_n$, and $a_1$; and in a slot 3, parameters on the frequency domain resource unit 1, the frequency domain resource unit 2, . . . , and the frequency domain resource unit n are successively $a_3$, . . . , $a_n$, $a_1$, and $a_2$. For the cell 2 and the cell 3, in a corresponding slot 1, slot 2, and slot 3, a corresponding adjustment is made according to the previously described solution.

As described above, RSs correspondingly generated by using different parameters (with a relatively low correlation with each other) are quasi-orthogonal. In some scenarios, it is expected that RSs of two cells on a same frequency domain resource unit are orthogonal. For example, in a D-TDD scenario, severe uplink-downlink cross interference may exist between cells (especially between neighboring cells). In this case, the base station may configure a same ID for the cell 1 and the cell 2. For example, the base station configures a virtual cell ID as the foregoing identification information of the cell. In this case, the cell 1 and the cell 2 may use a same parameter on a same frequency domain resource unit. Then the base station configures different orthogonal coefficients for the cell 1 and the cell 2, so that RSs finally generated for the cell 1 and the cell 2 on a same frequency domain resource unit can be orthogonal.

In addition, in this embodiment, subcarriers that each frequency domain resource unit is mapped to (or occupies) on the full bandwidth or the subband may be contiguous.

The RS in this embodiment may be a DMRS of a data part, or may be a DMRS of a control signaling part, or may be another RS.

Embodiment 2

This embodiment is based on Embodiment 1 and includes all features of Embodiment 1, and is a refined solution of the technical solutions of Embodiment 1.

The RS sequence mentioned in Embodiment 1 may be specifically a ZC sequence in this embodiment, and a corresponding parameter of the RS sequence may be a ZC root. Alternatively, the RS sequence may be a PN sequence, and a corresponding parameter of the RS sequence may be an initialized value Cinit. Certainly, the RS sequence may be any other sequence, and the parameter may be a parameter for generating the any sequence.

Based on this, in FIG. 11(a), FIG. 11(b), and FIG. 11(c), a parameter on each frequency domain resource unit may be specifically replaced with a ZC root or an initialized value Cinit.

In addition, it should be further noted that, when the RS sequence is a ZC sequence, different orthogonal coefficients, for example, different cyclic shift values, may be configured for two RS sequences to implement orthogonality between the two RS sequences. When the RS sequence is a PN sequence, different orthogonal coefficients, for example, different orthogonal cover codes (orthogonal cover code, OCC), may be configured for two RS sequences to implement orthogonality between the two RS sequences. Certainly, this application is not limited to the foregoing example manner of implementing orthogonality between RS sequences. For example, when the RS sequence is a ZC sequence, different OCCs may be configured for two RS sequences to implement orthogonality between the two RS sequences.

Embodiment 3

The following describes another embodiment in accordance with the disclosure.

Figure 12:
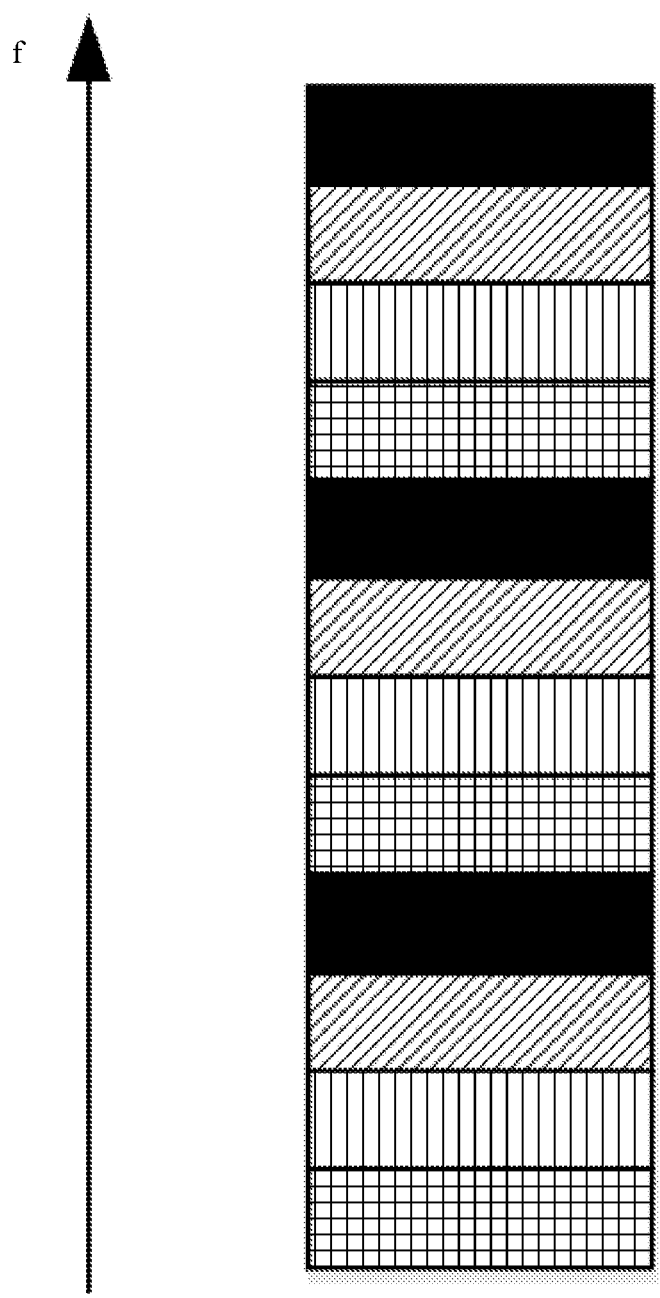
FIG. 12 is a schematic diagram of a frequency domain resource unit division manner according to an embodiment of this application.

In this embodiment, subcarriers to which each frequency domain resource unit is mapped on full bandwidth or a subband are non-contiguous. The non-contiguous subcarriers to which the frequency domain resource unit is mapped may be spaced apart at equal intervals or may be spaced apart at unequal intervals. FIG. 12 shows a possible frequency domain resource unit division manner. All three black parts constitute a frequency domain resource unit 1, all three slant line parts constitute a frequency domain resource unit 2, all three vertical line parts constitute a frequency domain resource unit 3, and all three grid line parts constitute a frequency domain resource unit 4. For example, an RS on the frequency domain resource unit may be an SRS, and the SRS is a pilot for performing non-contiguous mapping in frequency domain, and may be considered as a comb (comb) structure. Frequency division multiplexing may be implemented by configuring different combs, and orthogonality may be implemented between same combs through a cyclic shift. In a design of an LTE system, during transmission of SRSs of different comb densities, an RS length is determined based on a quantity of resource elements (resource element, RE) occupied by the SRS, to generate an RS. In an NR design, a frequency domain density of the SRS is configurable, in other words, a comb density is configurable. Therefore, there may be different comb densities in a same cell. In this case, combs of different densities may partially overlap, and overlapping parts are not orthogonal. Therefore, it is difficult for a base station end to differentiate between RSs of two terminals.

Figure 13:
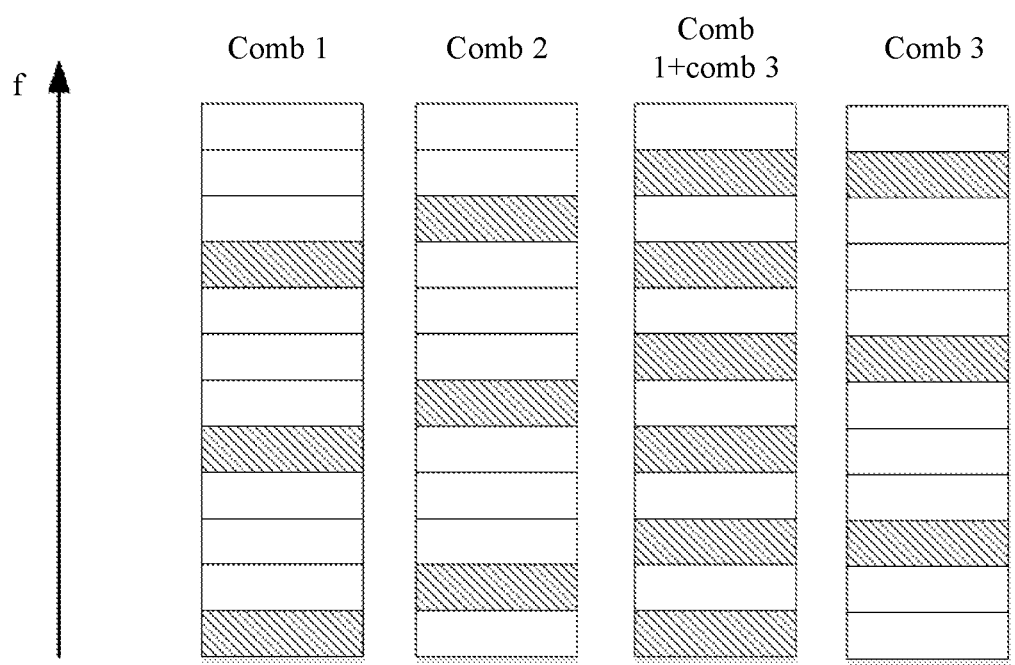
FIG. 13 is a schematic diagram of another frequency domain resource unit division manner according to an embodiment of this application.

In an implementation, based on the frequency domain resource unit in the first embodiment, a most sparse comb in a specific frequency domain resource may be defined as one frequency domain resource unit, and further division may be performed based on the most sparse comb. As shown in FIG. 13, a longitudinal direction is a frequency domain axis. In the figure, a first column, a second column, and a fourth column are combs with a density of ¼, and a third column is combs with a density of ½. Shadow parts in each of the first column, the second column, and the fourth column shown in the figure are one frequency domain resource unit, and the third column shows two frequency domain resource units.

In this embodiment, a manner in which each frequency domain resource unit is mapped to a subcarrier is different from that in the foregoing embodiment. Implementation of other technical solutions may be the same as that in the first embodiment, and details are not described herein again.

Figure 14:
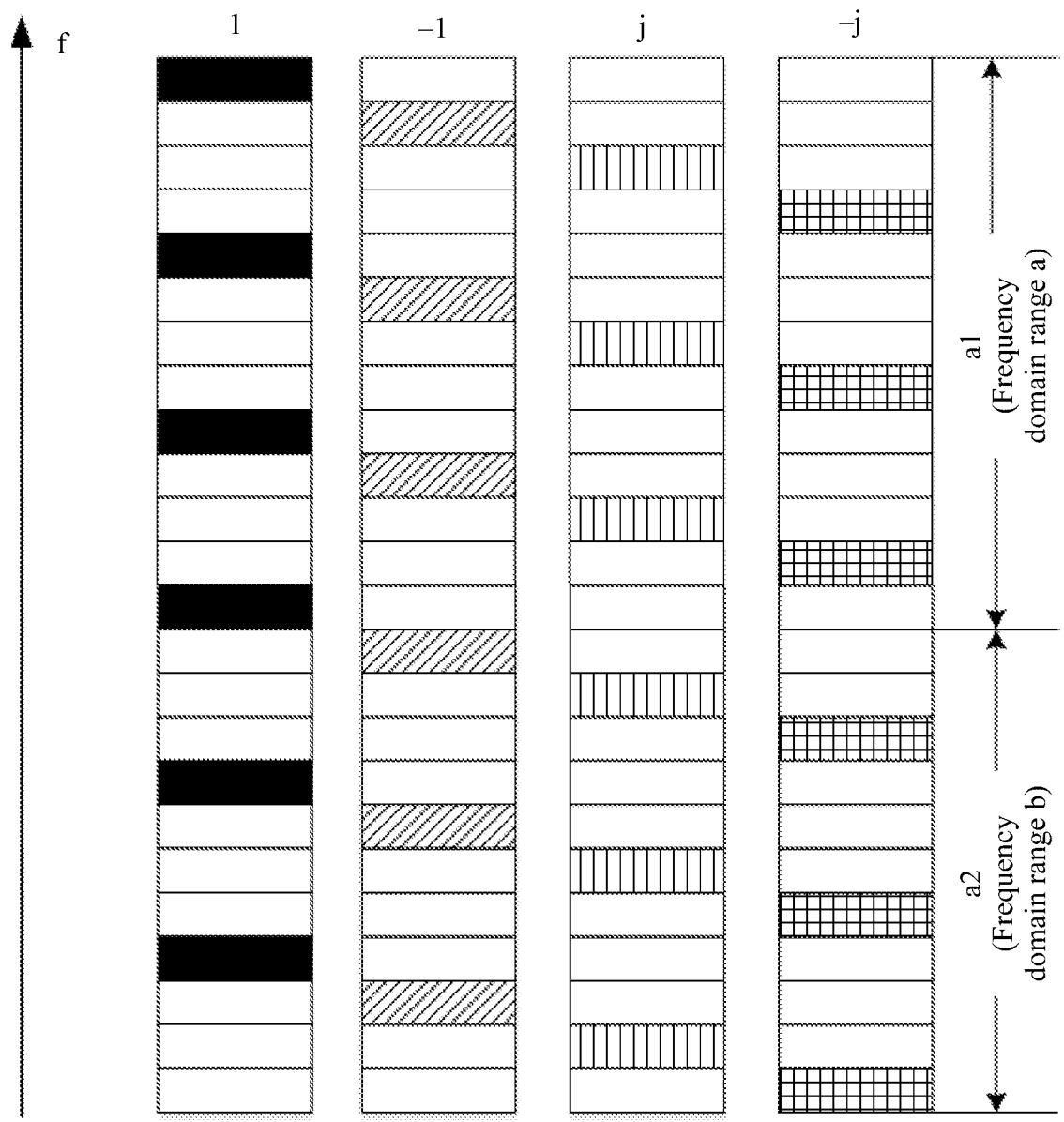
FIG. 14 is still another schematic diagram of parameter allocation according to an embodiment of this application.

In another implementation, a frequency domain range may include a plurality of different combs, namely, a plurality of different frequency domain resource units. For example, as shown in FIG. 12, in this case, a weighting coefficient of an RS may be further determined based on frequency domain location information of a frequency domain resource unit or a comb ID. For example, a same parameter for generating an RS sequence may be used for a plurality of frequency domain resource units in the frequency domain range (for example, on one RB), and different weighting coefficients are used for RS sequences generated by using the parameter. The weighting coefficient may be determined based on a start location of the frequency domain resource unit or a comb ID. Frequency domain resource units in different frequency ranges still use different parameters. For example, FIG. 14 shows two frequency domain ranges a and b. For ease of reading, the two frequency domain ranges are expanded based on different frequency domain resource units, but actually the two frequency domain ranges overlap in time domain. Four frequency domain resource units in the frequency domain range a have a same parameter a1, and the parameter a1 is different from a parameter a2 in the frequency domain range b. RSs generated on the four frequency domain resource units are multiplied by four different weighting coefficients, namely, phase shifts, which, for example, may be phase transform factors whose amplitude is 1: 1, −1, j, and −j. According to the method, a quantity of required parameters for generating an RS is further effectively reduced, and after a phase factor is specially designed, a requirement of reducing a PAPR can be met.

Embodiment 4

The following describes still another embodiment in accordance with the disclosure.

This embodiment is based on the foregoing three embodiments, in other words, has a new technical solution added based on the foregoing three embodiments.

As mentioned above, in an existing block RS design, a size of a block RS is set to a minimum length of a scheduled communication resource, so as to ensure that RSs on a multi-terminal communication resource overlapping part in MU-MIMO can be orthogonal. However, a larger size of a block (namely, a frequency domain resource unit) is more helpful in improving overall performance of a generated RS. Therefore, in this application, a size of a frequency domain resource unit may be flexibly configurable in frequency domain. When a frequency domain overlapping part in a multi-terminal communication resource in the MU-MIMO is relatively small, a relatively small frequency domain resource unit is configured. When a frequency domain overlapping part in a multi-terminal communication resource in the MU-MIMO is relatively large, a relatively large frequency domain resource unit is configured. Specifically, the size of the frequency domain resource unit may be determined based on a subband identifier, a frequency band identifier, configuration information of another device (for example, a base station), and a type of an RS sequence (for example, the RS sequence is a ZC sequence or a PN sequence). A size of a frequency domain resource unit of a cell on a same subband may have one or more configuration values, and a size of a frequency domain resource unit on different subbands or frequency bands (for example, a high frequency and a low frequency) may also have one or more configuration values. If there is only one configuration value for a size of a frequency domain resource unit on at least one of each subband and frequency band, and configuration values of sizes of frequency domain resource units between different subbands are the same or different, a first device may determine a size of a frequency domain resource unit based on a location of the at least one of the subband and the frequency band and a corresponding predefined value of the size of the frequency domain resource unit. If there are a plurality of configuration values for a frequency domain resource unit on at least one of each subband and frequency band, a terminal may determine a size of a frequency domain resource unit based on a configuration value of another device (for example, a base station), or a terminal may determine a size of a frequency domain resource unit based on a location of the at least one of the subband and the frequency band and a configuration value of another device (for example, a base station).

In addition, the terminal may further determine, based on the size of the frequency domain resource unit, a parameter of a sequence of an RS carried on the frequency domain resource unit. Generally, if a size of a frequency domain resource unit is larger, a sequence of an RS on each frequency domain resource unit is longer, and more parameters are selectable based on a characteristic of the RS (for example, a ZC sequence). If more parameters are selectable, parameters with a relatively low cross-correlation can be selected for allocation, to better meet a design requirement of an RS. In addition, because a size of a frequency domain resource unit varies, an identifier or an ID of the frequency domain resource unit at a same frequency domain location varies, and a parameter of a corresponding reference signal sequence also varies.

In an implementation, when there are a plurality of configuration values for a size of a frequency domain resource unit, a manner in which the base station configures a size of a frequency domain resource unit or indicates the configuration value to the terminal may include the following manners.

1. The base station indicates, to the terminal, a quantity of resource blocks (resource block, RB) to which the frequency domain resource unit is mapped or a quantity of subcarriers to which the frequency domain resource unit is mapped.

2. The base station predefines a size of a minimum frequency domain resource unit on full bandwidth or a subband, and indicates an aggregation level of the frequency domain resource unit to the terminal. For example, when the aggregation level is 2, an indicated size of a frequency domain resource unit is twice that of the minimum frequency domain resource unit; when the aggregation level is 3, an indicated size of a frequency domain resource unit is three times that of the minimum frequency domain resource unit; and so on. The aggregation level may be 1, 2, 3, 4, . . . , or may be 1, 2, 4, 8, . . . of an exponential form, or other forms.

3. The base station predefines a size of a maximum frequency domain resource unit on full bandwidth or a subband, and indicates a split level of the frequency domain resource unit to the terminal. For example, when the split level is 2, an indicated size of a frequency domain resource unit is ½ times that of the maximum frequency domain resource unit; when the aggregation level is 3, an indicated size of a frequency domain resource unit is ⅓ times that of the maximum frequency domain resource unit; and so on. The split level may be 1, 2, 3, 4, . . . , or may be 1, 2, 4, 8, . . . of an exponential form, or other forms.

4. The base station predefines some sizes of frequency domain resource units, and allocates index values that are in a one-to-one correspondence with the sizes of the frequency domain resource units to the sizes of the frequency domain resource units, and the base station indicates the index values to the terminal. For example, the base station predefines four sizes of frequency domain resource units, respectively 1, 2, 4, and 8 times a size of a minimum frequency domain resource, and allocates index values 0, 1, 2, and 3 to the four sizes of the frequency domain resource units, and then the base station indicates the index values to the terminal. For another example, on a subband 1, four sizes of frequency domain resource units are defined, and are respectively 1, 2, 3, and 4 times a size of a minimum frequency domain resource, and on the subband 1, four sizes of frequency domain resource units are defined, and are respectively 5, 6, 7, and 8 times the size of the minimum frequency domain resource. Index values configured by the base station are 0, 1, 2, and 3. For the subband 1, the index values are respectively corresponding to 1, 2, 3, and 4 times the size of the minimum frequency domain resource, and for a subband 2, the index values are respectively corresponding to 5, 6, 7, and 8 times the size of the minimum frequency domain resource. In this case, the base station may indicate an index value and a subband identifier (used to indicate the subband 1 or the subband 2) to the terminal, so that the terminal can determine an actual frequency domain resource size based on the index value and the subband identifier.

In addition, it should be noted that the size of the frequency domain resource unit in this application may be represented as a quantity of RBs to which an RS on the frequency domain resource unit is mapped, or a quantity of subcarriers to which an RS on the frequency domain resource unit is mapped, or the like.

In this embodiment, a size of a frequency domain resource unit in a communications system is configured, so that flexibility of the communications system is implemented, RS performance is improved, and indication overheads are reduced.

Embodiment 5

Figure 15:
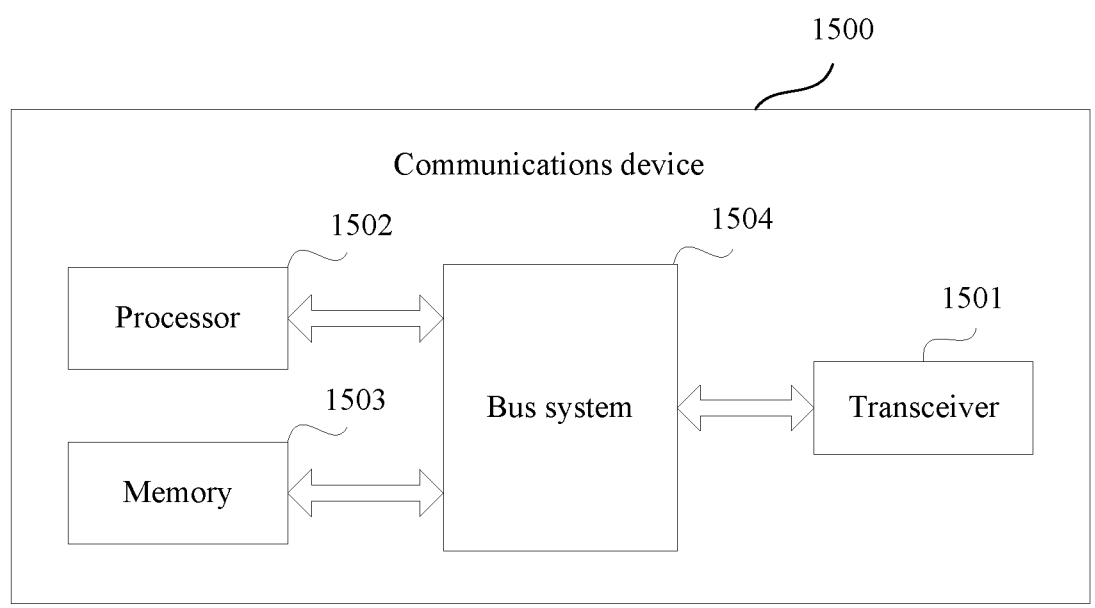
FIG. 15 is a schematic diagram of still another communications device according to an embodiment of this application.

This embodiment provides a schematic structural diagram of a communications device 1500. As shown in FIG. 15, the communications device 1500 includes a transceiver 1501, a processor 1502, a memory 1503, and a bus system 1504.

The memory 1503 is configured to store a program. In some embodiments, the program may include program code, and the program code includes a computer operation instruction. The memory 1503 may be a random access memory (random access memory, RAM), or may be a nonvolatile memory (nonvolatile memory), for example, at least one magnetic disk memory. Only one memory is shown in the figure. Certainly, a plurality of memories may be disposed as required. Alternatively, the memory 1503 may be a memory in the processor 1502.

The memory 1503 stores the following elements: an executable module or a data structure, a subset thereof, or an extended set thereof:

an operation instruction, including various operation instructions and used for implementing various operations; and an operating system, including various system programs and used for implementing various basic services and processing a hardware-based task.

The processor 1502 controls an operation of the communications device 1500, and the processor 1502 may also be referred to as a CPU (Central Processing Unit, central processing unit). During specific application, components of the communications device 1500 are coupled together by using the bus system 1504. In addition to a data bus, the bus system 1504 may include a power bus, a control bus, a status signal bus, and the like. However, for clear description, various types of buses in the figure are all marked as the bus system 1504. For ease of illustration, FIG. 15 merely shows an example of the bus system.

The terminal method disclosed in FIG. 9 or any one of Embodiment 1 to Embodiment 4; or the base station method disclosed in FIG. 9 or any one of Embodiment 1 to Embodiment 4 may be applied to the processor 1502, or implemented by the processor 1502. The processor 1502 may be an integrated circuit chip and has a signal processing capability. In an implementation process, steps in the foregoing methods can be implemented by using a hardware integrated logic circuit in the processor 1502, or by using instructions in a form of software. The processor 1502 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1503. The processor 1502 reads information in the memory 1503, and performs the method steps of the terminal described in FIG. 9 or any one of Embodiment 1 to Embodiment 4 with reference to hardware of the processor 1502; or performs the method steps of the base station described in FIG. 9 or any one of Embodiment 1 to Embodiment 4 with reference to hardware of the processor 1502.

According to the communications device 1500 provided in this embodiment, a PAPR when a single terminal sends data to a base station can be reduced, and communication interference between different cells can be canceled or reduced as much as possible. Further, the technical solutions can further ensure that parameters used to generate a reference signal sequence can be sufficiently allocated to each frequency domain resource unit, and ensure relatively small communications system resource overheads.

A person skilled in the art may further understand that various illustrative logical blocks (illustrative logical block) and steps (step) that are listed in the embodiments of this application may be implemented by using electronic hardware, computer software, or a combination thereof. In order to clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of the present invention.

The various illustrative logical blocks, modules, and circuits described in the embodiments of this application may implement or operate the described functions by using a general-purpose processing unit, a digital signal processing unit, an application-specific integrated circuit (ASIC), a field programmable gate array (FPGA) or another programmable logic apparatus, a discrete gate or transistor logic, a discrete hardware component, or a design of any combination thereof. The general-purpose processing unit may be a microprocessing unit. Optionally, the general-purpose processing unit may be any conventional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of this application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable disk, a CD-ROM, or a storage medium of any other form in the art. For example, the storage medium may be connected to a processing unit so that the processing unit can read information from the storage medium and write information to the storage medium. Alternatively, the storage medium may be integrated into a processing unit. The processing unit and the storage medium may be configured in an ASIC, and the ASIC may be configured in a user terminal. Alternatively, the processing unit and the storage medium may be configured in different components of the user terminal.

In one or more example designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium includes a computer storage medium and a communications medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general-purpose or special computer or a general-purpose or special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is also included in a defined computer-readable medium. The disc (disk) and the disk (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new characteristics of the present invention.

What is claimed is:

1. A method for communicating in a communications system, wherein the communications system comprises:
   a first cell;
   a second cell;
   a terminal; and
   a base station;
   wherein the method comprises:
   determining, by the terminal, a first parameter, based on frequency domain location information of a frequency domain resource unit, wherein the first parameter is for determining a sequence of a reference signal, and the reference signal is carried on the frequency domain resource unit; and
   transmitting, by the terminal, the reference signal to the base station, or receiving, by the terminal, the reference signal sent by the base station; and,
   wherein the terminal belongs to the first cell, where frequency domain resource units of the first cell comprise (1) a first frequency domain resource unit and (2) a second frequency domain resource unit, and the first parameter comprises a second parameter and a third parameter, wherein the second parameter is for determining the sequence of the reference signal carried on the first frequency domain resource unit, the third parameter is for determining the sequence of the reference signal carried on the second frequency domain resource unit, and the second parameter is different from the third parameter;
   the first parameter, based on the frequency domain location information for the frequency domain resource unit, varies between the first cell and the second cell;
   wherein, for the first cell, the second and the third parameters of the sequence of the resource signal constitute a first parameter set and for the second cell, the second and the third parameters of the sequence of the reference signal constitute a second parameter set, wherein the first parameter set is the same as or partially overlaps with the second parameter set; and
   wherein the communications system further comprises a full bandwidth or a sub-band that includes n-frequency domain resource units with contiguous frequency domain locations, and n-parameters are successively allocated to the n-frequency domain resource units with contiguous frequency domain locations in an order of $a_{1+x}, \ldots,$ and $a_{(n+x)\%n}$;
   where X is determined based on identification information of a cell, and % is a remainder operation symbol; or
   n-parameters are successively allocated to the n-frequency domain resource units with the contiguous frequency domain locations in an order of $a_{1+x}, a_{2+x}, \ldots,$ and $a_{(n+x)}$, where X is determined based on identification information of a cell.

2. The method according to claim 1, wherein one or more frequency domain resource units are for carrying the reference signal on the full bandwidth or the sub-band of the communications system.

3. The method according to claim 1, wherein the frequency domain location information of the frequency domain resource unit comprises:
   (1) an identifier of the frequency domain resource unit; or
   (2) a frequency domain start location of the resource unit.

4. The method according to claim 1, wherein the frequency domain resource unit is mapped to one or more contiguous subcarriers, or the frequency domain resource unit is mapped to a plurality of non-contiguous subcarriers; and when the frequency domain resource unit is mapped to non-contiguous subcarriers, the terminal further determines, based on the frequency domain location information of the frequency domain resource unit, a weighting coefficient for mapping the sequence of the reference signal to each subcarrier.

5. The method according to claim 1, wherein the terminal further determines the first parameter based on time domain location information of the frequency domain resource unit.

6. The method according to claim 1, wherein the terminal further determines the first parameter based on a size of the frequency domain resource unit.

7. The method according to claim 6, wherein the size of the frequency domain resource unit is indicated to the terminal by the base station.

8. The method according to claim 6, wherein the size of the frequency domain resource unit is determined based on at least one of: a sub-band identifier, a frequency band identifier, configuration information of the base station, and a type of the RS.

9. The method according to claim 1, wherein the terminal further determines the first parameter based on first configuration information of the base station.

10. The method according to claim 9, wherein the communications system further comprises a third cell; and when the first configuration information configured by the base station does not vary between the first cell and the third cell, for the first cell and the third cell, the first parameter does not vary, and the reference signal has different orthogonal coefficients.

11. The method according to claim 1, wherein the sequence of the reference signal is a Zadoff-Chu sequence, and the first parameter comprises a root of the ZC sequence; or the sequence of the reference signal is a pseudo random (PN) sequence, and the parameter is an initialized value of the PN sequence.

12. A method comprising:
a communications system that comprises:
a terminal; and
a base station;
wherein the method comprises:
determining, by the base station, a resource that is to be allocated to the terminal, wherein the resource comprises a frequency domain resource unit; and
receiving, by the base station, the reference signal sent by the terminal; or
sending, by the base station, the reference signal to the terminal;
wherein the reference signal is carried on the frequency domain resource unit, a sequence of the reference signal is determined by a sequence parameter; and, wherein the terminal belongs to a first cell, the first cell includes a first frequency domain resource unit and a second frequency domain resource unit, and the sequence parameter comprises a first parameter and a second parameter, wherein the first parameter is for determining the sequence of the reference signal carried on the first frequency domain resource unit, the second parameter is for determining the sequence of the reference signal carried on the second frequency domain resource unit, and the first parameter is different from the second parameter;

the communications system further comprises:
a second cell, and the sequence parameter for the frequency domain resource unit varies between the first cell and the second cell, wherein, for the first cell, the first and the second parameters for determining the sequence of the resource signal constitute a first parameter set and for the second cell, a third and a fourth parameters for determining the sequence of the reference signal constitute a second parameter set, wherein the first parameter set is the same as or partially overlaps with the second parameter set; and
wherein full bandwidth or a sub-band of the communications system includes n-frequency domain resource units with contiguous frequency domain locations, and n-sequence parameters are successively allocated to the n-frequency domain resource units with contiguous frequency domain locations in an order of $a_{1+x}, \ldots,$ and $a_{(n+x)\%n}$, where
X is determined based on identification information of a cell, and % is a remainder operation symbol; or
n-sequence parameters are successively allocated to the n-frequency domain resource units with contiguous frequency domain locations in an order of $a_{1+x}$, $a_{2+x}, \ldots,$ and $a_{(n+x)}$, where X is determined based on identification information of a cell.

13. The method according to claim 12, wherein one or more frequency domain resource units are used to carry the reference signal on full bandwidth or a sub-band.

14. The method according to claim 13, wherein the sequence parameter is further determined based on at least one of: time domain location information of the frequency domain resource unit, a size of the frequency domain resource unit, and first configuration information indicated to the terminal by the base station.

15. The method according to claim 14, wherein the size of the frequency domain resource unit is indicated to the terminal by the base station.

16. A communications apparatus comprises:
a processor, configured to determine a sequence parameter based on frequency domain location information of a frequency domain resource unit, wherein the sequence parameter is for determining a sequence of the reference signal, and the reference signal is carried on the frequency domain resource unit; and
a transceiver, configured to: send the reference signal to the base station, or receive the reference signal sent by the base station; and, wherein
a communications terminal belongs to a first cell, frequency domain resource units of the first cell comprise a first frequency domain resource unit and a second frequency domain resource unit, and the sequence parameter comprises a first parameter and a second parameter, wherein the first parameter is for determining the sequence of the reference signal carried on the first frequency domain resource unit, the second parameter is for determining the sequence of the reference signal carried on the second frequency domain resource unit, and the first parameter is different from the second parameter;
the communications system further comprises a second cell, and the sequence parameter for the frequency domain resource unit varies between the first cell and the second cell, wherein, for the first cell, first and second parameters of the sequence of the resource signal constitute a first parameter set and for the second cell, a third and a fourth parameter of the sequence of the reference signal constitute a second parameter set, wherein the first parameter set is the same as or partially overlaps with the second parameter set; and wherein full bandwidth or a sub-band of the communications system includes n-frequency domain resource units with contiguous frequency domain locations, and n-sequence parameters are successively allocated to the n-frequency domain resource units with contiguous frequency domain locations in a order of $a_{1+x}, \ldots,$ and $a_{(n+x)\%n}$, where X is determined based on identification information of a cell, and % is a remainder operation symbol; or n-sequence parameters are successively allocated to the n-frequency domain resource units with contiguous frequency domain locations in an order of $a_{1+x}, a_{2+x}, \ldots,$ and $a_{(n+x)}$, where X is determined based on identification information of a cell.

17. The communications apparatus according to claim 16, wherein one or more frequency domain resource units are used to carry the reference signal on full bandwidth or a sub-band.

\* \* \* \* \*